United States Patent [19]

Inniss et al.

[11] Patent Number: 5,555,291
[45] Date of Patent: Sep. 10, 1996

[54] METHOD AND SYSTEM FOR AUTOMATICALLY UPDATING TELEPHONE RESPONSE MECHANISM

[75] Inventors: Hadyn Inniss, Farmington Hills, Mich.; Sheila Scaggs, Fort Worth; Robert P. Welch, Colleyville, both of Tex.

[73] Assignee: International Business Machines Corporation, Armonk, N.Y.

[21] Appl. No.: 502,077

[22] Filed: Jul. 14, 1995

Related U.S. Application Data

[63] Continuation of Ser. No. 15,938, Feb. 10, 1993, abandoned.

[51] Int. Cl.$^6$ .................................................. H04M 1/64
[52] U.S. Cl. ................... 379/67; 379/72; 379/88
[58] Field of Search ................... 379/67, 70, 71, 379/72, 76, 84, 87, 88, 89, 201, 214

[56] References Cited

U.S. PATENT DOCUMENTS

| | | | |
|---|---|---|---|
| 3,794,778 | 2/1974 | Smith et al. | 379/71 |
| 4,389,546 | 6/1983 | Glisson et al. | 379/88 |
| 4,849,966 | 7/1989 | Willis et al. | 379/88 |
| 4,926,462 | 5/1990 | Ladd et al. | 379/89 |
| 4,969,136 | 11/1990 | Chamberlin et al. | 379/84 |
| 5,093,854 | 3/1992 | Sucato | 379/88 |
| 5,117,451 | 5/1992 | Ladd et al. | 379/67 |
| 5,138,655 | 8/1992 | Takashima et al. | 379/157 |
| 5,146,487 | 9/1992 | Bergsman et al. | 379/88 |
| 5,247,568 | 9/1993 | Bergsman et al. | 379/88 |
| 5,251,251 | 10/1993 | Barber et al. | 379/88 |

FOREIGN PATENT DOCUMENTS

| | | | |
|---|---|---|---|
| 0510411 | 10/1992 | European Pat. Off. | 379/88 |
| 63-104562 | 5/1988 | Japan . | |
| 0001360 | 1/1989 | Japan | 379/88 |
| 4095444 | 3/1992 | Japan | 379/67 |
| 4090244 | 3/1992 | Japan | 379/67 |

OTHER PUBLICATIONS

"The Digital Recorded Announcement Module, A new voice for DMS-100", Champagne et al., Telesis, 1983 one, pp. 23–29.

Primary Examiner—Krista M. Zele
Assistant Examiner—Scott L. Weaver
Attorney, Agent, or Firm—Geoffrey A. Mantooth

[57] ABSTRACT

A telephone response mechanism provides a response to a caller and an opportunity for the caller to leave a message. The telephone response mechanism is utilized when a telephone call arrives with no one to answer it. The response is made up of three portions. A first portion is automatically generated by a data processing system based upon the time of day, e.g. "Good morning". A second portion is a recorded message identifying the person being called, e.g. "This is John Doe. I am not currently available." The third portion is created from information obtained from a database on the data processing system, such as a calendar database or a personnel database. The third portion explains to the caller where the user (the person being called) is or when the user will return. The third portion is automatically updated whenever the user updates the database. A lockout feature is provided to deny the telephone response mechanism access to selected entries in the database.

4 Claims, 2 Drawing Sheets

METHOD AND SYSTEM FOR AUTOMATICALLY UPDATING TELEPHONE RESPONSE MECHANISM

This is a continuation of application Ser. No. 08/015,938 filed Feb. 10, 1993, now abandoned.

FIELD OF THE INVENTION

The present invention relates to methods and systems that automatically provide a response to unanswered telephone calls, such as with electronic phone mail systems.

BACKGROUND OF THE INVENTION

Electronic phone mail systems provide answering capabilities for incoming telephone calls. An incoming telephone call triggers a response mechanism in the electronic phone mail system that provides a prerecorded response to the caller and that provides an opportunity for the caller to leave a message for the phone mail user who is being called.

The prerecorded response typically identifies the person being called and provides other information to elicit the caller to leave a message. For example, the system generated response could say: "Hello. John Doe is not currently available. Please leave a message after you hear the tone." Alternatively, the user can record a more personal message in the user's own voice. For example, the response could say: "Hello. This is John Doe. I am not currently available. Please leave a message after you hear the tone."

Frequently, a user desires to provide more information to a caller. The message recorded by the user can provide limited information on the whereabouts of the user, such as: "Hello. This is John Doe. I am in the office today, but either on the telephone or away from my desk. Please leave a message after you hear the tone." However, with this type of response providing a caller with information on the user, effective phone mail use requires the user to update the phone mail response each day. Updating requires the user to dial in a series of codes or passwords. This process takes several minutes each day. Many users perceive this as a bother and provide callers only with identifying information. Furthermore, prior art telephone response mechanisms do not inform the caller when the user will be available.

Therefore, what is needed is a phone mail response mechanism that would provide useful information to a caller, and that would automatically update this information without the user.

SUMMARY OF THE INVENTION

It is an object of the present invention to provide a telephone response mechanism that provides information to a caller, such as when the caller will be available.

It is a further object of the present invention to provide a method and system for automatically updating the information provided by a telephone response mechanism.

The method of the present invention automatically updates a telephone response mechanism. The telephone response mechanism provides a response to a caller and an opportunity for the caller to leave a message. The method includes retrieving a first response portion. The method also retrieves information from a preselected database on a data processing system and creates a second response portion from the information. Then, the method plays the first response portion and the second response portion to the caller.

In one aspect of the present invention, the step of retrieving a first response portion further includes the step of retrieving a prerecorded message. In another aspect, the step of retrieving information from the preselected database further includes the step of retrieving the information from a calendar of a user who is being called. In still another aspect of the present invention, the method further includes the step of determining if access to the information on the database by the telephone response mechanism is authorized and if authorized, then the information is retrieved from the database.

The system of the present invention is for automatically updating a telephone response mechanism. The system includes means for retrieving a first response portion. There is also means for retrieving information from a preselected database on a data processing system and for creating a second response portion from the information. The system further includes means for playing the first response portion and the second response portion to the caller.

With the present invention, a caller is provided with information that assists the caller in communicating with the user. By selecting the database that is accessed by the telephone response mechanism, the user can provide a caller with information on the whereabouts of the user, when the user is likely to return, and even telephone numbers where the user can be currently reached.

The telephone response mechanism is automatically updated whenever the database is updated. This simplifies the use of the telephone response mechanism by the user, encouraging its use. The user need only be concerned with providing or denying access to specific entries to the telephone response mechanism.

The present invention combines recorded messages (recorded by either a data processing system or a user) with system generated data such as time of day and also with information retrieved from databases. A single response is played to a caller by merging the various portions together.

DESCRIPTION OF THE PREFERRED EMBODIMENT

Figure 1:
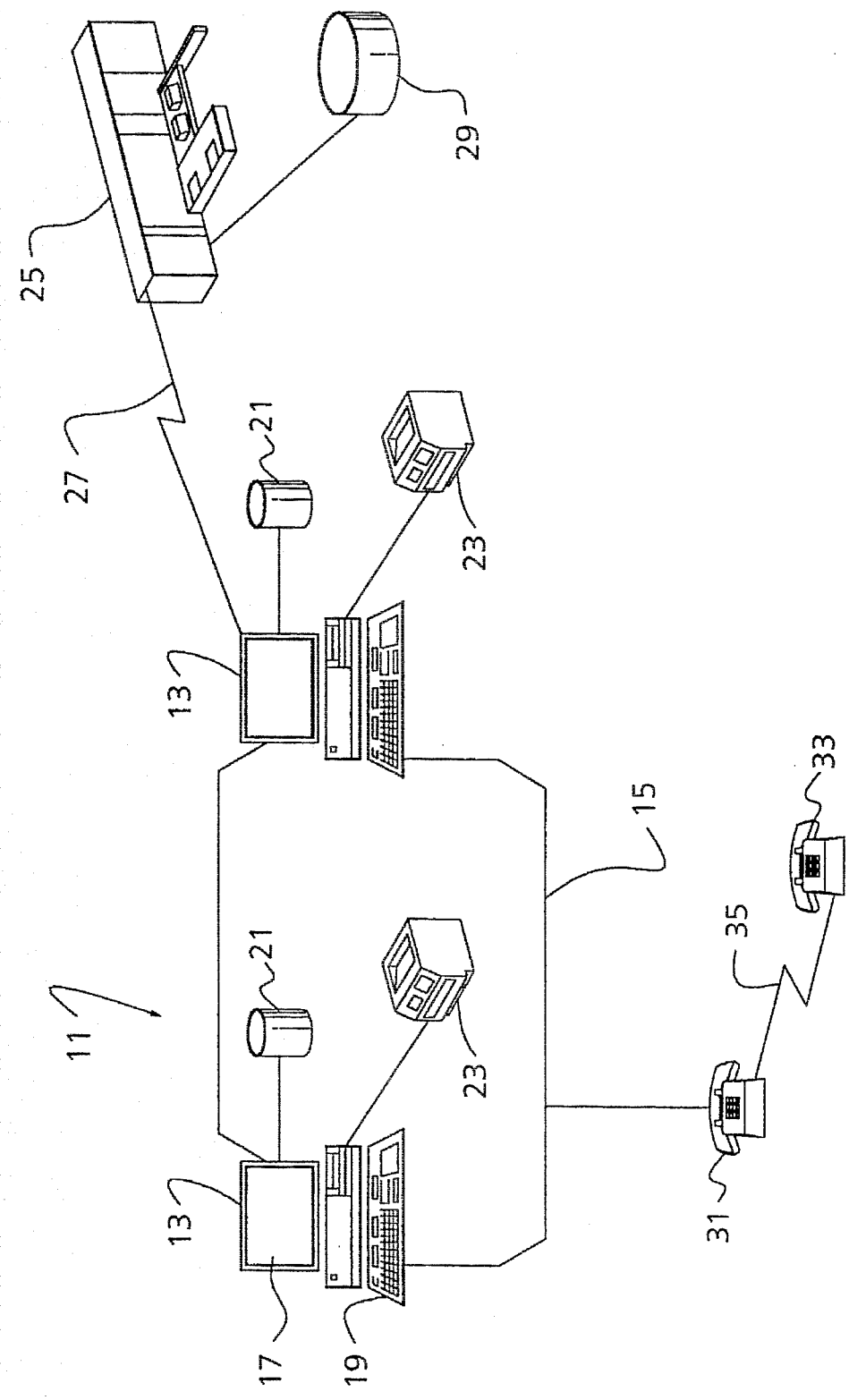
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers 13 which are connected together in a local area network (LAN) 15. Each computer 13 includes a user interface, which has a display screen 17 and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe computer 25 that is coupled to one of the computers 13 by a communication link 27. The mainframe computer 25 may also be coupled to a storage device 29 which may serve as a remote storage for the computers.

A first telephone 31 is connected to the data processing system 11. The first telephone 31 is also connected to a second telephone 33 over a conventional telephone line 35. The telephone line may be of the plain old telephone type (POTS) which utilizes audio carrier frequencies, or it may be of the multiplexed type which utilizes a digital carrier such as T–1. The telephones 31, 33 may support, in addition to audio capabilities, visual capabilities.

The data processing system 11 provides a telephone response mechanism, or phone mail system, for the telephone 31. The telephone response mechanism is automatically activated upon the occurrence of the first telephone 31 receiving a call from another telephone such as the second telephone 33. When activated, the telephone response mechanism provides a message or response to the caller. This response generally contains a greeting and identifies the user who has been called. After playing the response to the caller, the telephone response mechanism provides an opportunity for the caller to leave a message for the user.

With the present invention, the response provided to the caller is made up of several portions, which the user may configure. A first portion of the response provides a greeting based upon the time of day. A second portion of the response identifies the user to the caller. A third portion of the response provides information to the caller, which information is drawn from a data base on the data processing system 11. All of the portions are merged together to provide the response.

The first portion is automatically provided by the data processing system, based upon the time of day. The data processing system 11 has a clock which allows the data processing system to determine the time of day. Once the time of day is known, then the data processing system generates the first portion of the response. For example, in the morning, the first portion would be "Good morning". In the afternoon, the first portion would be "Good afternoon".

The second portion of the response identifies the user. Many phone mail systems have a default message for each user. If a user does nothing, then the second portion could be: "John Doe is not currently available." The default second portion is generated by the data processing system in a common voice for all users.

Alternatively, the user can record a personal message which is played in the user's voice instead of the default for the second portion. To record a personal second portion, the user accesses the phone mail system through either the telephone 31 or through one of the computers 13. The user then records a personal phone mail greeting stub For example, this could be, "This is John Doe. I am not currently available."

The third portion of the response is automatically drawn from a database on the data processing system 11. The user provides the information to the telephone response mechanism whenever the database is updated. For example, the telephone response mechanism can utilize the calendar of the user to provide a caller information on when the user will be available, or information on where the user is.

The user might make the following typical entries into the calendar database for a particular day:

9–10 am, meeting with boss, room 256, phone access= YES

12–1 pm, lunch, phone access=YES

2–3 pm, new product meeting, room 211, phone access= NO.

As the user makes entries into the calendar, the user determines if the information in the individual entries can be supplied to a caller. This is done by setting phone access to either YES or NO. A YES setting permits the telephone response mechanism to access and provide the information to a caller. A NO setting precludes the telephone response mechanism from accessing and providing the information to a caller.

The response is typically audio. However, the response can include visual messages if the telephone equipment in use supports visual capabilities.

Figure 2:
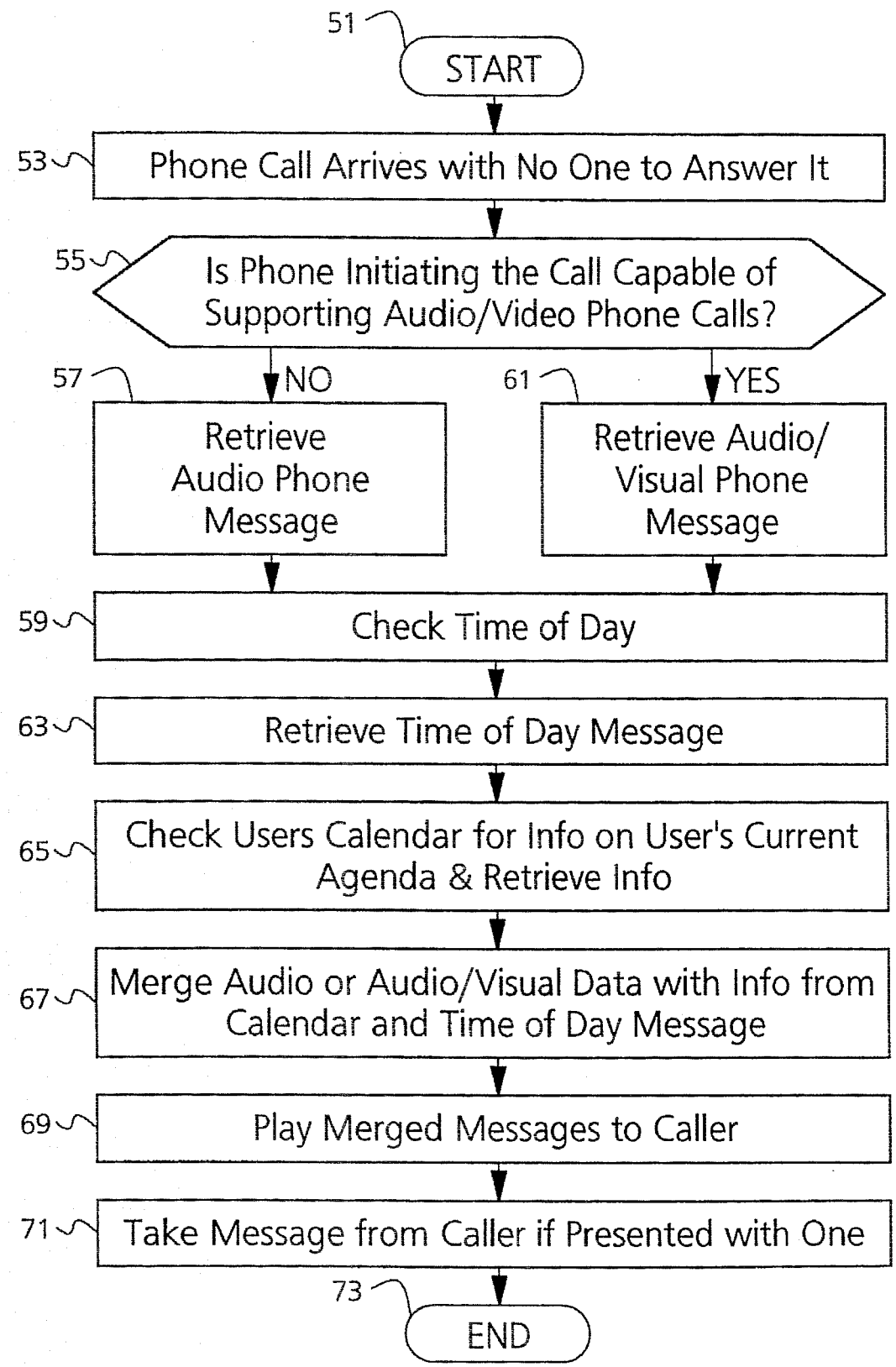
FIG. 2 is a flow chart showing the method of the present invention, in accordance with a preferred embodiment.

Referring now to FIG. 2, the method for answering a telephone call to the user's telephone 31 will be described. In the flow chart of FIG. 2, the following graphical conventions are observed: a rectangle for either a process or function and a diamond (step 55 is a stretched diamond) for a decision. These conventions are well understood by programmers skilled in the art of data processing and user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

The method starts, step 51. A phone call arrives at the telephone 31 with no one to answer it, step 53. The method proceeds to step 55, wherein the method determines if the phone initiating the call is capable of supporting audio/visual phone calls. If NO, then the method proceeds to step 57 to retrieve the audio phone message. This is the second portion of the response, which in the example is "This is John Doe. I am not currently available." The method then proceeds to step 59. If the result of step 55 is YES, then the method proceeds to step 61 to retrieve an audio/visual phone message. The method then proceeds to step 59.

In step 59, the method checks the time of day. In step 63, the method retrieves the time of day message, which is either "good morning", "good afternoon" or some other time of day greeting.

In step 65, the method checks the specified database such as the user's calendar for information on the user's current agenda and retrieves the information, if permitted, to provide the third portion of the message. The time of day is used to determine which entry from the calendar is utilized. If the time of day is 9:30 am, then the entry from 9–10 am is utilized to create the third portion. If Phone Access=YES, then the calendar entry is utilized to make up the third portion of the response. If Phone Access=NO, then the calendar entry is not utilized. The third portion instead asks the caller to leave a message.

The first, second and third portions are all merged together in the respective order in step 67. Then, the merged message portions are played to the caller, step 69. For example, if a call is made at 9:30 am, the response would be:

"Good morning!" (This is the first portion of the response obtained from the time of day.)

"This is John Doe. I am not currently available." (This is the second portion obtained from the recording by the user.)

"I am in a meeting that will end at 10:00 am. Please call me then or leave a message now." (This is the third portion which is created from the calendar entry by the data processing system.)

Alternatively, the third portion could provide even more information. For example, "I am in a meeting in room 256 until 10:00 am. Please call me there, leave a message or call me later."

If the call is made at 12:30 pm, then the response would be:

"Good afternoon!" (This is the first portion of the response.)

"This is John Doe. I am not currently available." (This is the second portion of the response.)

"I am at lunch. I will be back at 1:00. Please call me then or leave a message now." (This is the third portion of the response.)

If the call is made at 2:30 pm, then the response would be:

"Good afternoon!" (This is the first portion of the response.)

"This is John Doe. I am not currently available." (This is the second portion of the response.)

"Please leave a message after you hear the tone." (This is the third portion of the response.)

The third portion of the response is a default message that is utilized when access to the calendar entry is denied. Likewise, if the call is made at 4:00 pm, the response is the same as for a call made at 2:30 pm. This is because there is no calendar entry at 4:00 pm from which to make the third portion of the response.

Thus, the present invention provides a caller with additional information regarding the user who is being called. This additional information assists the caller in communicating with the user.

The present invention requires only a minimal amount of effort from the user to maintain an updated response. This is because the user need only maintain the database in an updated condition, something that the user is likely to do irregardless of the telephone response mechanism. The present invention automatically updates the response of the telephone response mechanism based upon the database. For each entry in the database, the user can either allow or block access to the entry by the telephone response mechanism.

Although the present invention has been described as providing a response with first, second and third portions, variations in the response are certainly possible. For example, the first portion (e.g. "Good morning") need not be provided at all. Instead, the second portion of the response could include a greeting such as: "Hello. This is John Doe. . ."

Although the present invention has been described with a calendar as the database that is used to provide the information for a telephone response, other databases can be used as well. For example, a personnel database could be utilized to automatically refer a caller to a user's secretary, associate or supervisor by name and telephone number.

The audio information making up each portion of the response can be generated by the data processing system, using for example, text-to-speech conversions. Alternatively, the user can record the first and second portions. The user can also record a set or library of words or sounds for the data processing to use to generate the third portion, as the information in the third portion is typically varied and wide ranging. For example, to generate the third portion from the information obtained from the calendar database, a standard third portion could be utilized: "I am __. I will be back at __. Please call me then or leave a message." The first blank is filled with the type of engagement noted on the calendar, e.g. "at a meeting". The second blank is filled with the time that the engagement is scheduled to end, e.g. "10:00 am".

The foregoing disclosure and the showings made in the drawings are merely illustrative of the principles of this invention and are not to be interpreted in a limiting sense.

We claim:

1. A method of automatically updating a telephone response mechanism, said telephone response mechanism providing a response to a caller, comprising the steps of:
    a) retrieving a first message portion;
    b) providing a plurality of information sets in a preselected database in a data processing system, providing each information set with an access attribute;
    c) determining a time of receipt of a call from said caller;
    d) selecting an information set from said plurality of information sets in said database based upon said determined time of receipt of a call from said caller, determining if, from said access attribute of said selected information set, access to said selected information set on said database by said caller is authorized and if authorized, then retrieving said selected information set from said database and creating a second message portion from said retrieved information set;
    e) playing said first message portion and said second message portion to said caller in a sequential manner.

2. The method of claim 1, wherein:
    a) said first message portion is a prerecorded message; and
    b) said step of providing a plurality of information sets in said preselected database further comprises the step of providing said plurality of information sets from a calendar that is on said data processing system said calendar belonging to a user who is being called.

3. A system for automatically updating a telephone response mechanism, said telephone response mechanism providing a response to a caller, comprising:
    a) means for retrieving a first message portion;
    b) means for providing a plurality of information sets in a preselected database in a data processing system and for providing each of said information sets with an access attribute;
    c) means for determining a time of receipt of a call from said caller;
    d) means for selecting an information set from said plurality of information sets in said database based upon said determined time of receipt of a call from said caller and for determining from said access attribute of said selected information set, if access to said selected information set on said database by said caller is authorized and if authorized, then for retrieving said selected information set from said database and creating a second message portion from said retrieved information set;
    e) means for playing said first message portion and said second message portion to said caller in a sequential manner.

4. The system of claim 3, wherein:
    a) said first message portion is a prerecorded message; and
    b) said means for providing a plurality of information sets in said preselected database further comprises means for providing said plurality of information sets from a calendar that is on a data processing system, said calendar belong to a user who is being called.

* * * * *